June 29, 1954     C. W. WULFF     2,682,232
METHOD OF MOUNTING DAMPING DEVICES ON RAILWAY CAR TRUCKS
Filed March 18, 1950     2 Sheets-Sheet 1
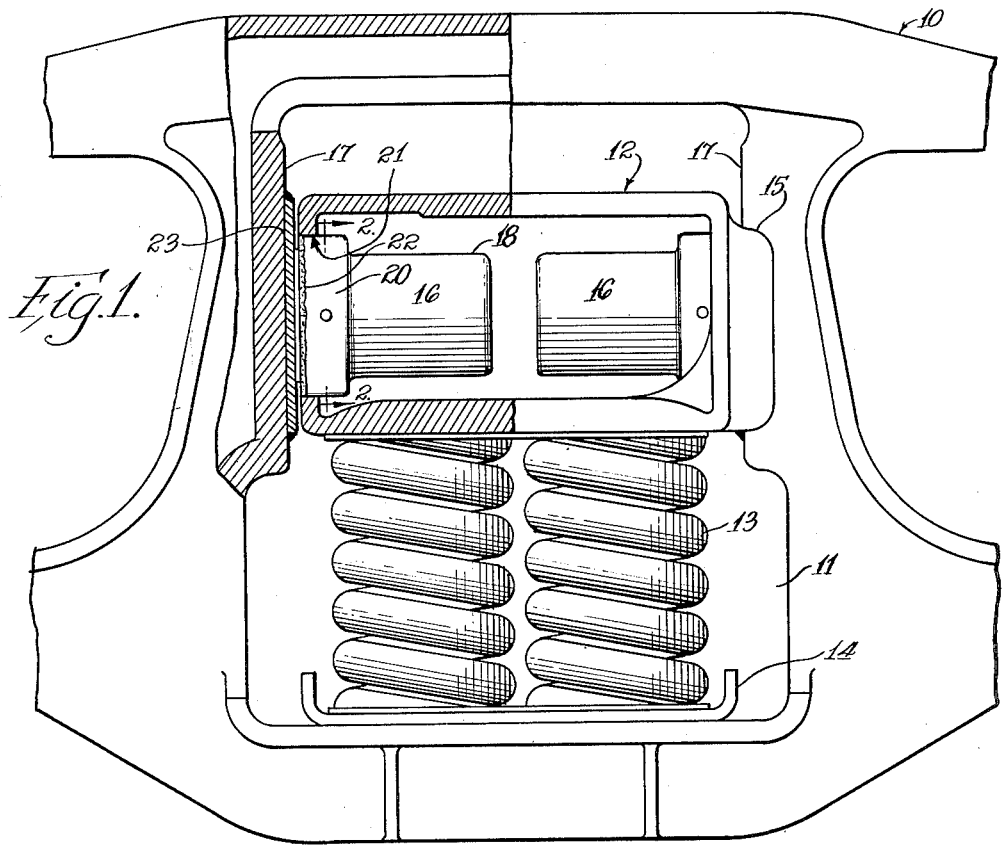
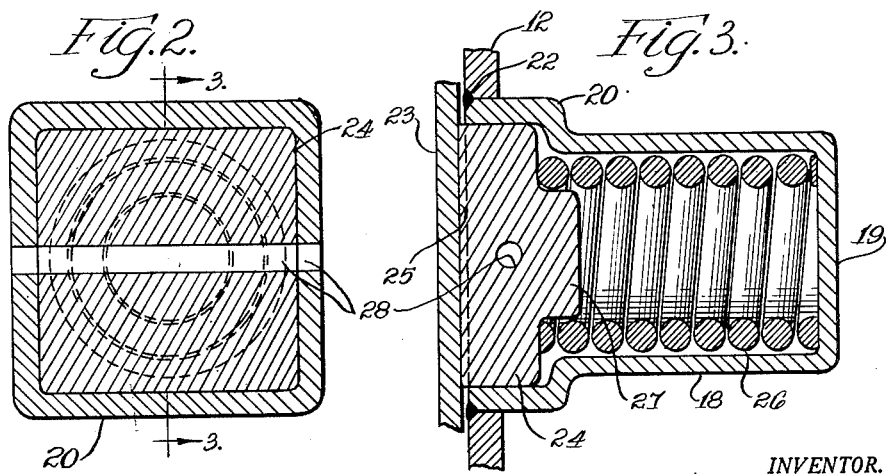
INVENTOR.
Cal W. Wulff
BY
Mann and Brown
Atty.

June 29, 1954   C. W. WULFF   2,682,232
METHOD OF MOUNTING DAMPING DEVICES ON RAILWAY CAR TRUCKS
Filed March 18, 1950   2 Sheets-Sheet 2
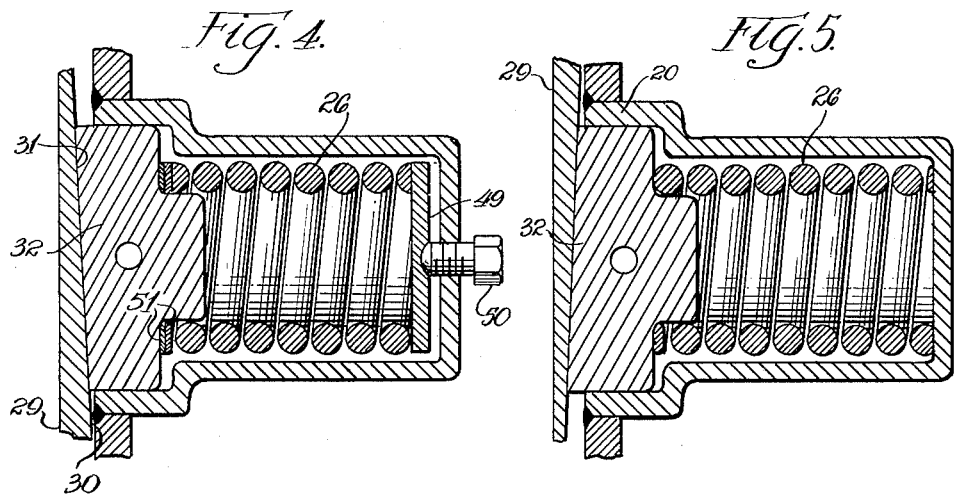
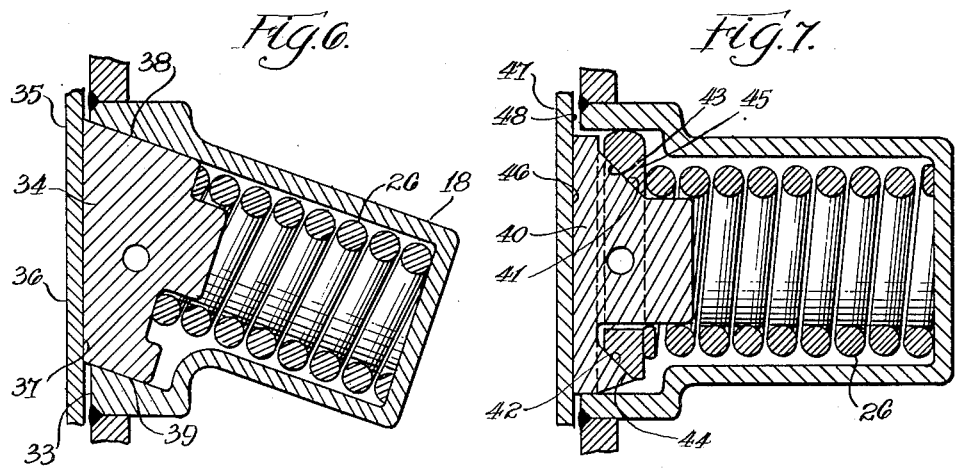
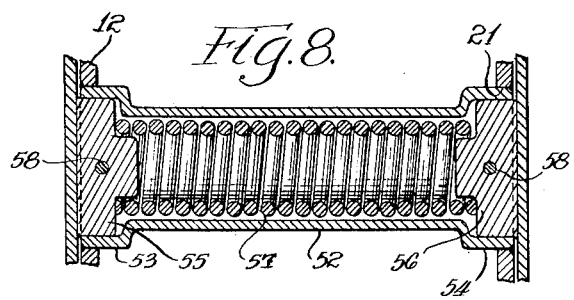
INVENTOR.
Cal W. Wulff
BY Mann and Brown
Atty.

Patented June 29, 1954

2,682,232

UNITED STATES PATENT OFFICE 2,682,232

METHOD OF MOUNTING DAMPING DEVICES ON RAILWAY CAR TRUCKS

Cal W. Wulff, Chicago, Ill., assignor to Holland Company, a corporation of Illinois Application March 18, 1950, Serial No. 150,375

10 Claims. (Cl. 105—197)

Most new freight car trucks being manufactured and sold today are equipped with damping devices for frictionally resisting movement of the bolster in at least one direction. There is still a great divergence of opinion whether the bolster movement should be cushioned on down travel or up travel, or both, and the trucks are equipped with devices designed to suit the preferences of the purchasers.

There is a need, however, for a simple damping device which can be applied to conventional car trucks, which were not designed to have a damping device located between the bolster and the side frame columns, and it is the principal object of this invention to supply that need. The damping device of this invention can be readily modified so that it provides any desired type of cushioning or damping action, and is characterized by its simplicity, ruggedness and ease of installation.

Further and other objects will become apparent as the disclosure proceeds and the description is read in conjunction with the accompanying drawings, in which Figure 1 is a fragmentary side elevational view of a freight car truck of the spring plank type equipped with the damping device of this invention, and with parts broken away to better disclose the installation of the device;

Figure 2 is a sectional view through one form of the device, the section being taken on the line 2—2 of Figure 1;

Figure 3 is a longitudinal sectional view taken on the line 3—3 of Figure 2;

Figure 4 shows a modified form of the invention in which the damping device provides greater cushioning effect upon the down travel of the bolster;

Figure 5 is a view corresponding to Figure 4 but showing the friction shoe arranged to provide greater cushioning effect upon the up travel of the bolster;

Figure 6 shows another form of the damping device designed to provide slightly greater cushioning action for downward travel of the bolster;

Figure 7 shows still another modification of the device which also provides slightly greater downward cushioning action; and Figure 8 illustrates one way in which two units may be combined into one for simplification.

It will be understood that the disclosures of certain preferred forms of the invention are for the purpose of complying with 35 USC Section 112 and that the invention may be variously modified within the scope of the appended claims.

Referring first to Figure 1, there is shown the side frame 10 of a conventional type freight car truck, the side frame being provided with a bolster opening 11 within which the truck bolster 12 rides. The bolster is supported on a plurality of springs 13 which rest upon a spring seat carried by a spring plank 14 at the bottom of the bolster opening. The movement of the bolster within the side frame bolster opening 11 is guided by laterally extending guide flanges 15 integral with the bolster. It will be understood that similar flanges are provided on the other side of the side frame, as is customary.

The damping device of this invention, generally designated 16, is of such shape and size that two of the devices may be readily installed at each end of the bolster for cooperation with the adjacent side frame columns 17 of the side frame 10. The damping unit 16 has a cylindrical housing 18 closed at one end, as shown at 19, and provided at the other end with an enlarged portion 20 of non-circular shape and preferably square or rectangular, as shown in Figure 2. In applying the unit to existing car trucks, the truck bolster is removed and openings 21 are cut into opposite sides of the bolster adjacent each end. The units 16 are then welded into place along the weld line, indicated at 22. The bolsters are open at each end so that the damping unit 16 may be readily held in place during the welding operation.

Wear plates 23 are welded to the side frame columns 17 of the side frame 10, and these wear plates cooperate with the friction shoes 24 which are mounted within the housings 18. The friction shoe is preferably made of friction iron and in the form of the invention shown in Figures 1, 2 and 3, the friction shoe has a wear surface 25 that is perpendicular to the axis of the damping unit. The shoe 24 is urged outwardly against the wear plate 23 by a coil spring 26 which seats against the wall 19 of the housing 18 and fits over an inwardly extending hub 27 on the friction shoe 24.

With the wear surface 25 normal to the axis of the unit, a substantially constant damping force is applied to the bolster during its up and down movement within the bolster opening 11. In other words, the damping unit is characterized in this instance by the substantially uniform pressure that is exerted against the wear plate 23 as the bolster rises and descends in the side frame bolster opening 11. In other forms of the invention disclosed herein, this pressure is varied according to the direction of movement of the bolster, as will be hereinafter described more fully.

In order to hold the friction shoe within the housing 18 during installation of the unit, the shoe 24 and enlarged portion 20 of the housing 18 are provided with aligned apertures 28 through which a retaining pin, not shown, may be passed to hold the unit in assembled relation. After the bolster has been fitted with the unit 16 and has been reassembled in the truck frame, the pins are driven from the unit 16, whereupon the friction shoes 24 are urged against the juxtaposed wear plates 23.

Referring now to Figure 4, there is shown a modification of the damping unit which provides for increased friction shoe pressure as the truck bolster moves downwardly. In this case, the wear plate 29 has a wedge face 30 cooperating with a correspondingly inclined face 31 of the friction shoe 32. It is obvious that as the bolster moves downwardly the wedge faces of the wear plate 29 and friction shoe 32 cooperate to provide an increased spring pressure urging the shoe 32 into engagement with the wear plate 29, with the result that an increased frictional force is provided to dampen the relative movement between the bolster and the side frame. Similarly, as the bolster moves upwardly, a decreased frictional force is applied.

In the form of the invention shown in Figure 5, the friction shoe 32 of Fig. 4 is merely reversed within the enlarged portion 20 and likewise the wear plate 29 is inverted when installed on the face of the side frame column 17. As a result, the damping unit provides increased friction shoe pressure as the bolster moves upwardly within the side frame bolster opening 11 and decreased pressure when it moves downwardly.

In Figure 6, the spring 26 with its housing 18 is inclined with respect to the outer face 33 of the unit so that when the unit is welded into place within the bolster, the spring exerts a slight upward pressure against the friction shoe 34. The wear plate 35 in this instance has parallel faces 36 and 37 and the angle of the spring 26 is relied upon for providing increased friction shoe pressure as the bolster moves downwardly due to the unequal wedging action of the shoe 34 against the inner housing walls 38 and 39 of the unit 16. In other words, as the bolster moves upwardly with respect to the side frame, the downward inclination of the wall 39 provides less resistance to inward movement of the shoe 34 than when the bolster moves downwardly, due to the added friction pressure between the top of the friction shoe 34 and the adjacent wall 38 of the housing.

Another advantage of the inclined spring is that it keeps the shoe 34 biased against one of the housing walls and therefore minimizes noise due to slapping of the shoe within the housing.

Obviously, the unit could be inverted so that the spring would have an upward inclination to provide for opposite damping action on the truck bolster.

In Figure 7, the friction shoe 40 is provided with wedge faces 41 and 42 which cooperate with corresponding wedge faces 43 and 44, respectively, of a wedge plate 45 interposed between the spring 26 and the friction shoe 40. The friction surface 46 of the shoe 40 is normal to the axis of the unit and the wear plate 47 also has a vertical wear face 48.

It will be seen that as the bolster moves downwardly with respect to the side frame and wear plate 47, the cooperating wedge faces of the friction shoe 40 and wedge plate 45 cause slightly greater friction pressure to be applied to the plate 47 than when the bolster moves in the opposite direction due to the angularity of the wedge faces. Furthermore, the arrangement is such that the friction shoe 40 can accommodate itself to any slight cocking action of the bolster, since the shoe 40 is provided with clearance at the top, and the wedge plate 45 has a slightly rounded top surface, with the result that the spring 26 constantly biases the shoe 40 downwardly and the wedge plate 45 upwardly. In this way, the shoe 40 may tilt about a horizontal axis without creating a binding action in the housing.

In all of the above described embodiments of the invention, the damping unit may be provided with an adjusting device (Figure 4) consisting of a spring seat 49 interposed between the bottom of the spring 26 and the end 19 of the housing. The position of the seat 49 may be adjusted longitudinally of the housing 18 by an adjusting screw 50. Further adjustments can be made by interposing shims 51 between the spring and shoe, as also shown in Figure 4.

In Figure 8, there is shown a damping device comprising a housing 52 having enlarged ends 53 and 54 which house friction shoes 55 and 56, respectively, urged apart by a spring 57. The friction shoes are temporarily retained within the housing 52 by retaining pins 58 passing through aligned apertures in the shoes and housing. The entire unit is slipped into place through one of the aligned openings 21 cut in the bolster, and the perimeters of the enlarged portions 53 and 54 are welded to the bolster.

After the damping unit has been installed within the bolster, the latter is reassembled in the truck frame and the retaining pins 58 then driven out so that the friction shoes 55 and 56 bear against the wear plates 23 provided on the side frame columns 17 of the bolster opening 11.

Obviously, the distinctive features of the embodiments of the invention shown in Figures 1 to 5 inclusive and Figure 7 may be also embodied in the form of the invention shown in Figure 8. Also it is possible to employ a variable rate spring of the type disclosed, for example, in Holland Patent No. 2,387,264 with any of the embodiments shown (particularly the embodiments shown in Figures 4 and 5) in order to obtain a non-linear friction force per increment of spring deflection.

Instead of a retaining pin being used to hold the friction shoe within the housing during installation, other means might be used, as for example, a bolt fixed to the shoe and projecting rearwardly through the wall 19 where it receives a nut that limits forward movement of the shoe. By properly adjusting the position of the nut on the bolt, it may either permit free longitudinal movement of the shoe with respect to the housing during operation (as is desired) or may hold the shoe within the housing during installation or removal of the bolster.

Obviously, the units 16 could be mounted in openings in the side frame columns 17 to bear against wear plates on the bolster, if desired.

Although the invention has been shown applied to a truck of the spring plank type, it is equally applicable to a spring plankless truck. Also, it is obvious that the device of this invention cushions lateral movement of the bolster as well as vertical movement, and also tends to maintain the truck side frames and bolster in proper alignment, which is of particular importance in the spring plankless type truck.

I claim:

1. The method of converting an existing railway car truck of the type having a side frame provided with a bolster opening defined in part by a column member and having an undamped bolster member resiliently supported in said bolster opening for cushioned movement therein, to one in which the bolster member is frictionally dampened in its vertical movement within said bolster opening, said method consisting in cutting a hole through a wall of one of the members adjacent to the other member and mounting a damping device about said hole, said damping device including a rigid housing mounted over the hole in the mounting member and firmly secured to said mounting member to thereby restore the strength of the mounting member lost by the cutting of the hole therethrough, a friction shoe mounted in the housing and engaging said other member, and spring means urging the friction shoe into engagement with said other member.

2. The method of converting an existing car truck of the type having a side frame provided with a bolster opening defined in part by a column member and having an undamped bolster resiliently supported in said bolster opening for cushioned movement therein, to one in which the bolster is frictionally dampened in its vertical movement within the bolster opening, said method consisting in cutting a hole through a side wall of the bolster adjacent the column member and mounting a damping device within the bolster about said hole, said damping device including a rigid housing mounted over said hole and having at least a portion thereof firmly anchored to the bolster whereby the housing restores the strength of the bolster lost by the cutting of the hole therethrough, a friction shoe mounted in the housing and frictionally engaging the side frame column member, and a spring interposed between the friction shoe and housing for continually urging the friction shoe into such engagement.

3. The method as set forth in claim 1 in which the housing of the damping device is of generally cylindrical shape and has an enlarged non-circular portion at the open end thereof, and in which said friction shoe conforms generally in shape to the enlarged portion of the housing.

4. The method as set forth in claim 3 in which the friction shoe has an inclined face adapted to mate with a correspondingly inclined wearplate mounted on the opposed member.

5. The method as set forth in claim 1 in which the housing is of generally cylindrical shape and has its longitudinal axis inclined to the horizontal.

6. The method as set forth in claim 2 in which the housing is of generally cylindrical shape and has a non-circular enlarged portion at the open end thereof, and in which the friction shoe conforms in shape to the enlarged portion of the housing.

7. The method as set forth in claim 1 in which the bolster member has opposed side walls and one such hole is cut in each of said opposed side walls at one end of the bolster member, and in which one of said damping devices is mounted within the bolster member between said opposed side walls over each of said holes.

8. The method as set forth in claim 1 in which the bolster member has opposed side walls and one such hole is cut in each of said opposed side walls at both ends of said bolster member, and in which one of said damping devices is mounted within the bolster member between said opposed side walls over each of said holes.

9. The method as set forth in claim 1 in which said hole is cut in the bolster member and in which a wear plate is secured to the column member adjacent thereto for cooperation with said friction shoe.

10. The method as set forth in claim 1 in which a wear plate is secured to said other member opposite said hole for cooperation with said friction shoe.

References Cited in the file of this patent

UNITED STATES PATENTS

| Number | Name | Date |
|---|---|---|
| 1,130,665 | Bullock | Mar. 2, 1915 |
| 1,452,529 | Scheibli | Apr. 24, 1923 |
| 1,834,944 | Gillespey | Dec. 8, 1931 |
| 2,365,198 | Lehrman | Dec. 19, 1944 |
| 2,370,105 | Edstrom | Feb. 20, 1945 |
| 2,408,866 | Marquardt | Oct. 8, 1946 |
| 2,424,936 | Light | July 29, 1947 |
| 2,437,359 | Pierce | Mar. 9, 1948 |
| 2,446,506 | Barrett et al. | Aug. 3, 1948 |
| 2,485,973 | Lehrman | Oct. 25, 1949 |